US007942259B2

(12) United States Patent
Steven et al.

(10) Patent No.: US 7,942,259 B2
(45) Date of Patent: May 17, 2011

(54) TUBULAR CONVEYOR BELT

(75) Inventors: Robin Steven, Marysville, OH (US);
Lawrence K. Nordell, Bellingham, WA (US); Yijin Zhang, Bellingham, WA (US)

(73) Assignee: Veyance Technologies, Inc., Fairlawn, OH (US)

( * ) Notice: Subject to any disclaimer, the term of this patent is extended or adjusted under 35 U.S.C. 154(b) by 6 days.

(21) Appl. No.: 12/510,404

(22) Filed: Jul. 28, 2009

(65) Prior Publication Data
US 2010/0018841 A1 Jan. 28, 2010

Related U.S. Application Data

(60) Provisional application No. 61/084,188, filed on Jul. 28, 2008.

(51) Int. Cl.
*B65G 15/08* (2006.01)
*B65G 15/40* (2006.01)
(52) U.S. Cl. ........................................ 198/819
(58) Field of Classification Search .................. 198/819
See application file for complete search history.

(56) References Cited

U.S. PATENT DOCUMENTS

| 4,819,791 | A | * | 4/1989 | Melander | 198/818 |
| 5,060,787 | A | * | 10/1991 | Tingskog | 198/819 |
| 5,232,084 | A | * | 8/1993 | Simonsen et al. | 198/819 |
| 5,328,023 | A | * | 7/1994 | Hinkelmann et al. | 198/847 |
| 5,460,261 | A | * | 10/1995 | Kusel et al. | 198/819 |
| 6,029,801 | A | * | 2/2000 | Odin et al. | 198/847 |
| 6,540,069 | B2 | * | 4/2003 | Tschantz | 198/844.1 |
| 6,712,199 | B1 | * | 3/2004 | Bruckner et al. | 198/810.03 |
| 6,991,093 | B2 | * | 1/2006 | Tschantz | 198/819 |
| 7,051,868 | B2 | * | 5/2006 | Mindich | 198/819 |
| 7,261,203 | B2 | * | 8/2007 | Mindich | 198/819 |
| 7,726,468 | B2 | * | 6/2010 | Brunone | 198/819 |

FOREIGN PATENT DOCUMENTS

WO    WO 2005123552 A1 * 12/2005 ............. 198/819

\* cited by examiner

*Primary Examiner* — Mark A Deuble
(74) *Attorney, Agent, or Firm* — Kathleen K Bower; Alvin T Rockhill

(57) ABSTRACT

A conveyor belt for use in a tubular conveyor belt system has a width and a length, and a longitudinal centerline. The conveyor belt further has a first longitudinal edge, and an opposing second longitudinal edge, wherein during use, the first longitudinal edge and the second longitudinal edge overlap to form an overlap region, thus forming the belt into a tube-like shape. The conveyor belt further has a load bearing region, wherein the load bearing region is located evenly about the belt longitudinal centerline, throughout the length of the belt. Further, there is a first anti-rotation region and a second anti-rotation region, wherein the first anti-rotation region is located between the first longitudinal edge and the load bearing region, and the second anti-rotation region is located between the second longitudinal edge and the load bearing region. The first and second longitudinal edges, and the load bearing region comprise longitudinal reinforcement members, and the first and second anti-rotation regions do not comprise longitudinal reinforcement members.

21 Claims, 3 Drawing Sheets

US 7,942,259 B2

TUBULAR CONVEYOR BELT

This application claims the benefit of U.S. Provisional Application No. 61/084,188 filed Jul. 28, 2008.

BACKGROUND

The present invention is in the field of conveyor belts for pipe conveyors. More specifically this invention relates to the type of pipe conveyor belts wherein the edges overlap when the belt pipe is formed.

With tube conveyors, also referred to as hose-type belt conveyors, or pipe conveyors, mechanical means are used to form the conveyor into a closed tube in the conveying zone. The conveying zone is the area downstream of the loading area, and upstream of the discharge area. Difficulties arise in use for these types of conveyors in regards to controlling the rotation of the belt. Prior art has steel cords or other reinforcements running throughout the belt. Therefore, the overlap section is heavier than the rest of the belt, since it has two full reinforced areas on top of each other. This top heavy section causes the belt to rotate as the belt encounters horizontal or vertical curves. Rotation of the belt can cause damage to the belt edges, and also can cause leakage of the conveyed material. Further, these cords can cause the belt to buckle as the belt encounters horizontal or vertical curves. The cords are useful in the overlap region however, as when rotation does occur, they help maintain a seal on the belt, such that the material being conveyed is better maintained within the pipe belt.

A tubular conveyor belt is desired which would maintain a good seal if rotation occurs, and which would better resist rotation. Further, a tubular conveyor belt is desired which would resist buckling during horizontal or vertical curves.

SUMMARY

Figure 1:
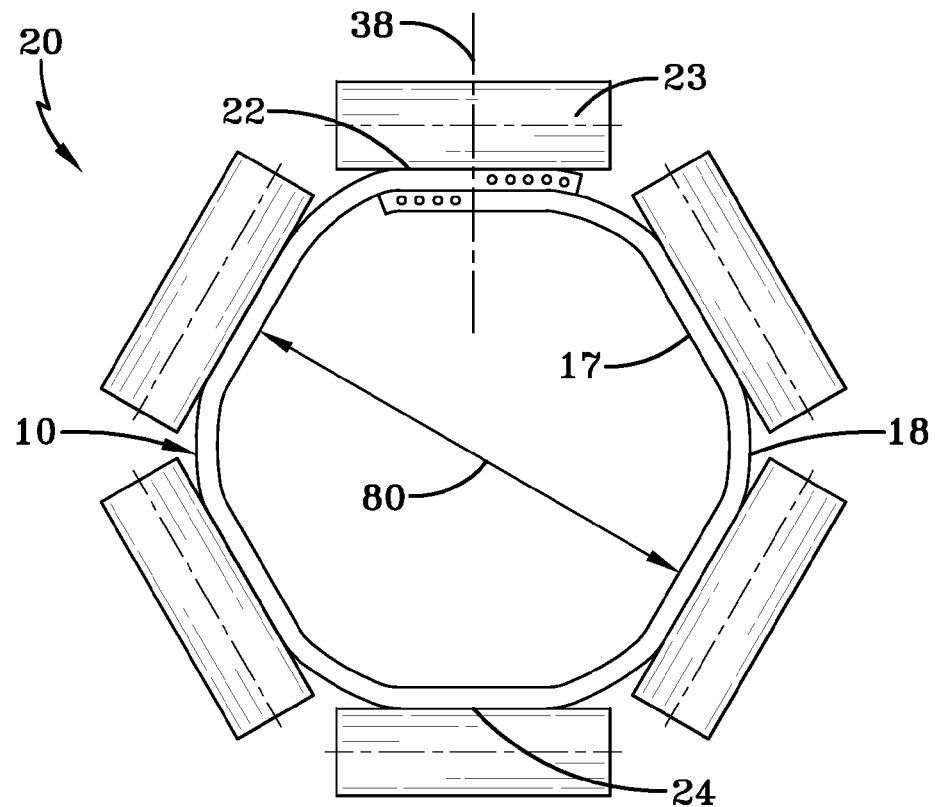
FIG. 1 is a cross sectional view of a tubular conveyor belt assembly according to an aspect of the invention.
Figure 2:
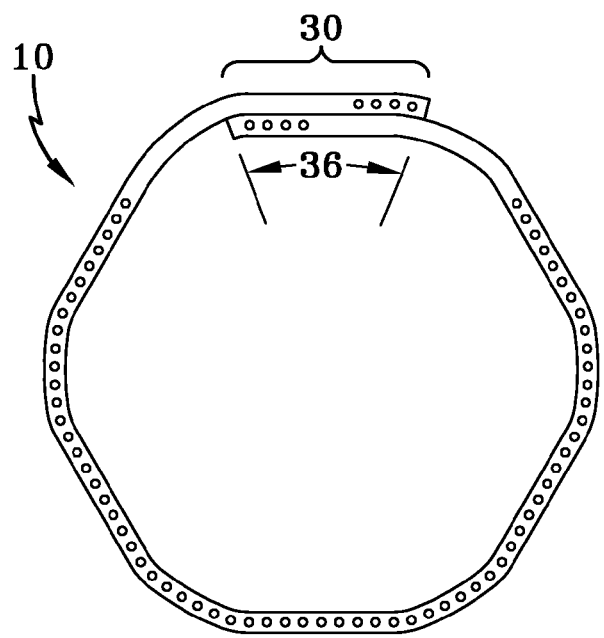
FIG. 2 is a cross sectional view of a tubular conveyor belt according to an aspect of the invention.
Figure 3:
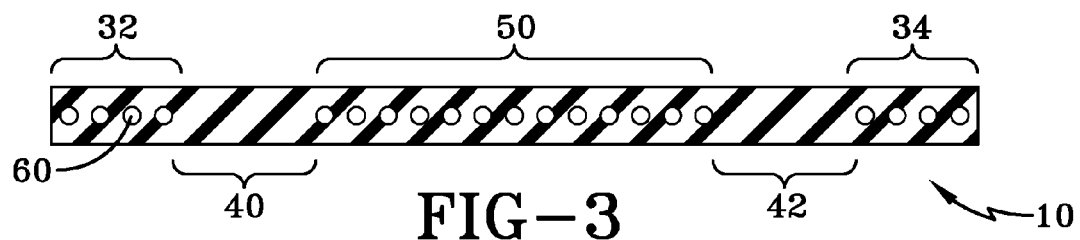
FIG. 3 is a cross sectional view of a tubular conveyor belt according to an aspect of the invention.
Figure 4:
FIG. 4 is a cross sectional view of a tubular conveyor belt according to an aspect of the invention.
Figure 5:
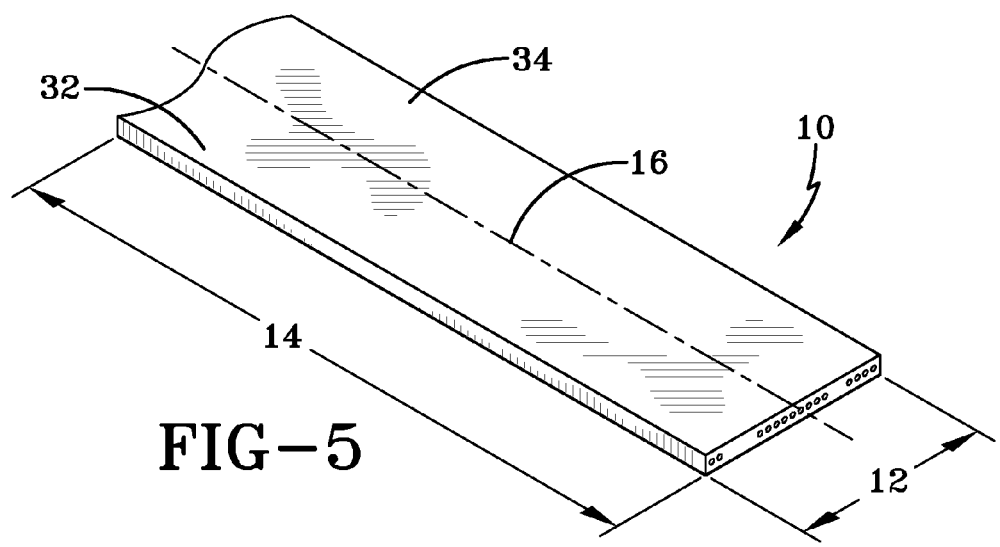
FIG. 5 is an isometric view of a tubular conveyor belt according to an aspect of the invention.
Figure 6:
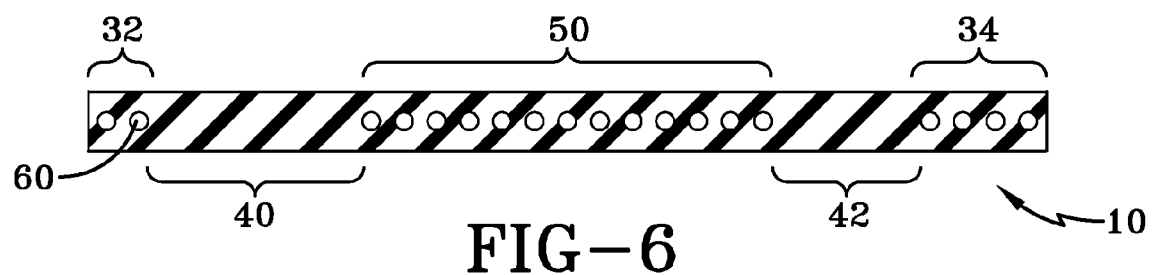
FIG. 6 is a cross sectional view of a tubular conveyor belt according to an aspect of the invention.
Figure 7:
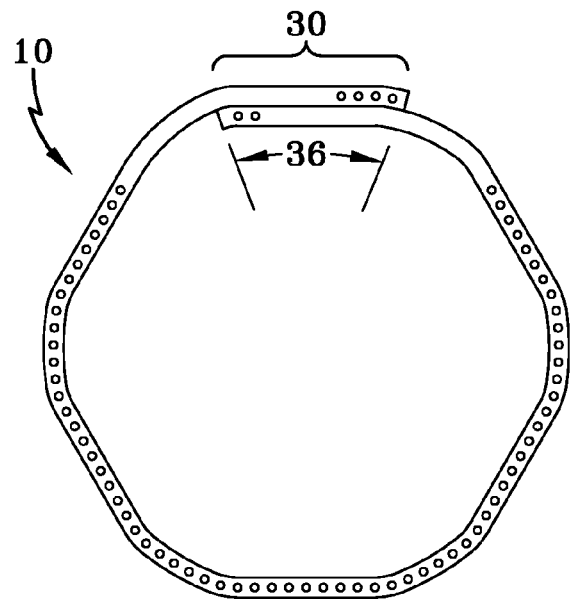
FIG. 7 is a cross sectional view of a tubular conveyor belt according to an aspect of the invention.

A conveyor belt for use in a tubular conveyor belt system has a width and a length, and a longitudinal centerline. The conveyor belt further has a first longitudinal edge, and an opposing second longitudinal edge, wherein during use, the first longitudinal edge and the second longitudinal edge overlap to form an overlap region, thus forming the belt into a tube-like shape. The conveyor belt further has a load bearing region, wherein the load bearing region is located evenly about the belt longitudinal centerline, throughout the length of the belt. Further, there is a first anti-rotation region and a second anti-rotation region, wherein the first anti-rotation region is located between the first longitudinal edge and the load bearing region, and the second anti-rotation region is located between the second longitudinal edge and the load bearing region. The first and second longitudinal edges, and the load bearing region comprise longitudinal reinforcements members, and the first and second anti-rotation regions do not comprise longitudinal reinforcement members.

DETAILED DESCRIPTION

Various aspects of the invention are presented in FIGS. 1-7 which are not drawn to scale and in which like components are numbered alike. According to an aspect of the invention, a conveyor belt 10 for use in a tubular conveyor belt system 20 has a width 12 and a length 14, and a longitudinal centerline 16.

Such conveyor belts have a body 19 which can be comprised of a wide variety of elastomeric materials, both synthetic and/or natural. For instance, the body of the conveyor belt can optionally be comprised of a thermoplastic elastomer or a cured rubber, although any suitable material is considered within the purview of the invention. The body 19 of the conveyor belt 10 will typically be comprised of a vulcanized rubber, including but not limited to, natural rubber, synthetic polyisoprene rubber, cis-1,4-polybutadiene rubber, nitrile rubber, ethylene-propylene-diene rubber (EPDM), styrene-butadiene rubber (SBR), styrene-isoprene rubber (SIR), styrene-isoprene-butadiene rubber (SIBR), and various blends thereof. For instance, tubular belts that are designed to convey hot materials, such as hot cement, limestone, or gypsum compositions, can optionally be made with EPDM rubber. Tubular belts that are specifically designed to have improved oil and/or chemical resistance can be made utilizing a nitrile rubber. On the other hand, general purpose tubular belts that have good abrasion resistance can be made with various blends of styrene-butadiene rubber and natural rubber.

The conveyor belt width 12 is comprised of four regions; an overlap region 30, a first anti-rotation region 40, a second anti-rotation region 42, and a load bearing region 50. The conveyor belt 10 has a first longitudinal edge 32, and an opposing second longitudinal edge 34, wherein during use, the first longitudinal edge 32 and the second longitudinal edge 34 overlap to form the overlap region 30, thus forming the belt 10 into a tube-like shape.

The load bearing region 50 is located evenly about the belt longitudinal centerline 16, throughout the length of the belt.

The first anti-rotation region 40 is located between the first longitudinal edge 32 and the load bearing region 50, and the second anti-rotation region 34 is located between the second longitudinal edge 34 and the load bearing region 50.

According to an aspect of the invention, the first and second longitudinal edges 32/34, and the load bearing region 50 comprise longitudinal reinforcement members 60, and the first and second anti-rotation regions 40/42 do not comprise longitudinal reinforcement members 60.

FIG. 1 illustrates a tubular conveyor belt system 20 wherein the belt 10 is forced to move in the desired direction (up, down, through turns, and the like) by a series of idler rolls 23 which are positioned around the belt 10. The idler rolls 23 are also positioned around the belt to hold it in a "closed" tubular conformation in conveying zones and allow it to "open" in loading zones and in discharge areas.

During use, it is desired to have the overlap region 30 at the top 22 of the system, and the load bearing region 50 at the bottom 24 of the system. Thus, the longitudinal reinforcement members 60 in the load bearing region 50 can work to carry the material being conveyed, and the seal in the overlap region maintains the conveyed material within the belt system. Prior art has reinforcement members throughout the span of the belt. Having the anti-rotation regions 40/42 free of longitudinal reinforcement members 60 eliminates the tangential rotational forces normally induced by these reinforcement members. Further, eliminating the reinforcement members in these areas eliminates the longitudinal force normally caused by these members, which acts towards the horizontal and/or vertical loci during horizontal or vertical curves, and may cause collapse of the pipe form due to horizontal and vertical curve pressures.

According to another aspect of the invention, the first anti-rotation region 40 and the second anti-rotation region 42 each span between 5% to 15% of the belt width 12. According to a further aspect of the invention, each anti-rotation region may be 1% to 15%, and in a further embodiment, each anti-rotation region may be 5% to 10%.

In a further aspect of the invention, the overlap region 30 has a width 36, and the overlap region width 36 is between 5% to 15% of the belt width 12. In a further embodiment of the invention, the overlap region may be between 10-15% of belt width.

In another aspect of the invention, the load bearing region 50 spans between 40% to 80% of the belt width 12. In a further embodiment of the invention, the load bearing region may span between 50% to 74% of the belt width.

The belt 10 has an inner surface 17, and an outer surface 18, and in a further aspect of the invention the belt 10 comprises an outer fabric reinforcement layer 74 on the outer surface 18. In one embodiment of the invention, the outer fabric reinforcement layer 74 covers the overlap region 30, the first and second anti-rotation regions 40/42, and the load bearing region 50.

In a further embodiment, when the diameter 80 of the belt as formed is equal to or less than about 250 mm, the outer fabric reinforcement layer 74 covers the first and second anti-rotation regions 40/42, and the load bearing region 50, but does not cover the overlap region 30. In a further embodiment, when the diameter 80 of the belt as formed is equal to or less than about 250 mm, the outer fabric reinforcement layer 74 partially covers the first and second anti-rotation regions 40/42, and covers the load bearing region 50, but does not cover the overlap region 30.

In a further aspect of the invention, when the diameter 80 is greater than about 250 mm, the belt 10 can optionally further comprises an inner fabric reinforcement layer 72 on the inner surface 17, wherein the inner fabric reinforcement layer 72 covers the first and second anti-rotation regions 40/42, and the load bearing region 50. In a further aspect of the invention, when the diameter 80 is greater than about 250 mm, the belt 10 can optionally further comprises an inner fabric reinforcement layer 72 on the inner surface 17, wherein the inner fabric reinforcement layer 72 partially covers the first and second anti-rotation regions 40/42, and covers the load bearing region 50. The amount of coverage of the fabric reinforcement layers 74 and/or 72 may be adjusted on a case by case basis to adjust the overall stiffness of the belt to accommodate various operating conditions, such as the ultimate diameter 80 of the tube-like shape, and/or the number and tightness of the bends in the conveying system.

The fabric reinforcement layer can be comprised of a wide variety of natural and/or synthetic materials. In many cases it is desirable for the fabric reinforcement layer to be comprised of a nylon (polyamide) fabric which has been treaded with a resorcinol-formaldehyde-latex (RFL) dip.

According to an aspect of the invention, the longitudinal reinforcement members 60 are steel cords. In a preferred embodiment of the invention, there are four or less steel cords in the first longitudinal edge 32, and four or less steel cords in the second longitudinal edge 34. The overlap region 30 has a centerline 38, and according to an aspect of the invention, the longitudinal reinforcement members 60 are spaced in the first longitudinal edge 32 and the second longitudinal edge 34 such that when in use, the longitudinal reinforcement members 60 in the first and second longitudinal edges 32/34 are symmetric about the overlap region centerline 38 in relation to each other.

In a further embodiment, the first and second longitudinal edges 32/34 are asymmetric about the overlap region centerline 38 in relation to each other. This would be the case when, for example, the first longitudinal edge 32 would be on top of the second longitudinal edge 34 during use, and the first longitudinal edge 32 contains more reinforcement members than the second longitudinal edge 34. This typically makes the first longitudinal edge 32 more flexible and allows it to make a tighter seal when it is wrapped over the second longitudinal edge 34 to close the belt into a tubular conformation (in conveying zones). It also normally reduces the amount of wear that occurs as the belt opens and closes as it moves between loading zones, conveying zones, and discharge zones. In one further embodiment of this invention the first longitudinal edge optionally has two or three reinforcement members, while the second longitudinal edge 34 has four reinforcement members. In another alternative embodiment the first longitudinal edge 32 could contain one or two reinforcement members with the second longitudinal edge 34 contains three reinforcement members. This might be done in a system to allow the outer edge 32 to be more flexible, such that it will bend better, and wear less during use. Meanwhile the stiffness of the inner edge 34 would be sufficient to maintain a tight seal and keep the transferred material in the tube belt. Such asymmetrical designs wherein the first longitudinal edge 32 contains fewer reinforcement members than the second longitudinal edge 34 can also be more energy efficient since less power is needed to open and close the tubular belt as it moves between loading zones, conveying zones, and discharge zones.

We claim:

1. A conveyor belt for use in a tubular conveyor belt system wherein said conveyor belt has a width and a length, and a longitudinal centerline, comprising:
    a first longitudinal edge, and an opposing second longitudinal edge, wherein during use, said first longitudinal edge and said second longitudinal edge overlap to form an overlap region, thus forming the belt into a tube-like shape;
    a load bearing region, wherein said load bearing region is located evenly about the belt longitudinal centerline, throughout the length of the belt;
    a first anti-rotation region and a second anti-rotation region, wherein said first anti-rotation region is located between said first longitudinal edge and said load bearing region, and said second anti-rotation region is located between said second longitudinal edge and said load bearing region; and
    wherein said first and second longitudinal edges, and said load bearing region comprise longitudinal reinforcements members, and wherein said first and second anti-rotation regions do not comprise longitudinal reinforcement members.

2. The conveyor belt of claim 1 wherein said first anti rotation region and said second anti-rotation region each span between 5% to 15% of the belt width.

3. The conveyor belt of claim 1 wherein said first anti rotation region and said second anti-rotation region each span between 1% to 15% of the belt width.

4. The conveyor belt of claim 1 wherein said first anti rotation region and said second anti-rotation region each span between 5% to 10% of the belt width.

5. The conveyor belt of claim 1 wherein said overlap region has a width, and said overlap region width is between 5% to 15% of the belt width.

6. The conveyor belt of claim 1 wherein said overlap region has a width, and said overlap region width is between 5% to 10% of the belt width.

7. The conveyor belt of claim 1 wherein said load bearing region spans between 40% to 80% of the belt width.

8. The conveyor belt of claim 1 wherein said load bearing region spans between 50% to 74% of the belt width.

9. The conveyor belt of claim 1, wherein said belt has an inner surface, and an outer surface, and further comprising an outer fabric reinforcement layer on said outer surface.

10. The conveyor belt of claim 9 wherein said outer fabric reinforcement layer covers said overlap region, said first and second anti-rotation regions, and said load bearing region.

11. The conveyor belt of claim 9 wherein said tube-like shape has a diameter, and wherein said diameter is equal to or less than about 250 mm, wherein said outer fabric reinforcement layer covers said first and second anti-rotation regions, and said load bearing region, but does not cover said overlap region.

12. The conveyor belt of claim 9 wherein said tube-like shape has a diameter, and wherein said diameter is equal to or less than about 250 mm, wherein said outer fabric reinforcement layer partially covers said first and second anti-rotation regions, and covers said load bearing region, but does not cover said overlap region.

13. The conveyor belt of claim 9 wherein said tube-like shape has a diameter, and wherein said diameter is greater than about 250 mm further comprising an inner fabric reinforcement layer on said inner surface, wherein said inner fabric reinforcement layer covers said first and second anti-rotation regions, and said load bearing region.

14. The conveyor belt of claim 9 wherein said tube-like shape has a diameter, and wherein said diameter is greater than about 250 mm further comprising an inner fabric reinforcement layer on said inner surface, wherein said inner fabric reinforcement layer partially covers said first and second anti-rotation regions, and covers said load bearing region.

15. The conveyor belt of claim 1 wherein said longitudinal reinforcement members are steel cords.

16. The conveyor belt of claim 15 wherein there are four or less steel cords in said first longitudinal edge, and four or less steel cords in said second longitudinal edge.

17. The conveyor belt of claim 1 wherein said wherein said first and second longitudinal edges comprise an equal number of longitudinal reinforcements members.

18. The conveyor belt of claim 1 wherein said wherein said first longitudinal edge comprises less longitudinal reinforcements members than said second longitudinal edge.

19. The conveyor belt of claim 1 wherein when said conveyor belt is formed into said tube-like shape, said tube-like shape has a top and a bottom, and a center, and wherein a centerline which passes through said top and through said center, wherein said longitudinal reinforcement members in said first and second longitudinal edge are symmetrical about said centerline.

20. The conveyor belt of claim 1 wherein when said conveyor belt is formed into said tube-like shape, said tube-like shape has a top and a bottom, and a center, and wherein a centerline which passes through said top and through said center, wherein said longitudinal reinforcement members in said first and second longitudinal edge are not symmetrical about said centerline.

21. The conveyor belt of claim 1 wherein when said conveyor belt is formed into said tube-like shape, said tube-like shape has a top and a bottom, and a center, and wherein a centerline which passes through said top and through said center, wherein said load bearing region is symmetrical about said centerline.

* * * * *